(12) United States Patent
McIntyre

(10) Patent No.: US 6,899,202 B1
(45) Date of Patent: May 31, 2005

(54) BRAKE ASSEMBLY FOR A BICYCLE

(76) Inventor: John McIntyre, 13450 S. High Point Dr., Traverse City, MI (US) 49684

( * ) Notice: Subject to any disclaimer, the term of this patent is extended or adjusted under 35 U.S.C. 154(b) by 0 days.

(21) Appl. No.: 10/640,601

(22) Filed: Aug. 13, 2003

(51) Int. Cl.7 .............................. B62L 3/00; F16D 55/08
(52) U.S. Cl. ................. 188/24.22; 188/72.7; 188/24.12
(58) Field of Search .......................... 188/24.11, 24.12, 188/24.13, 24.14, 24.15, 24.16, 24.22, 72.7

(56) References Cited

U.S. PATENT DOCUMENTS

| | | | | |
|---|---|---|---|---|
| 3,989,124 A | * | 11/1976 | Fujii ............................ | 188/26 |
| 4,061,206 A | * | 12/1977 | Wood .......................... | 188/26 |
| 5,501,301 A | * | 3/1996 | Nishimura ............... | 188/24.19 |
| 6,148,964 A | * | 11/2000 | Huang ......................... | 188/26 |
| 6,264,008 B1 | * | 7/2001 | Jordan et al. ............ | 188/24.22 |
| 6,491,137 B2 | * | 12/2002 | Lumpkin et al. ......... | 188/24.15 |

\* cited by examiner

Primary Examiner—Robert A. Siconolfi
(74) Attorney, Agent, or Firm—James M. Deimen

(57) ABSTRACT

A novel brake assembly is provided for a bicycle. The assembly is composed of an arrangement of a pair of brake pads each connected to a rod member in turn guided for axial movement by a base fixed on the bicycle frame. A bifurcated control cable actuates wedge members causing movement of the pads against a wheel rim. Return springs on the rod members cause the assembly to return to the original non-braking position in response to release of the control cable.

16 Claims, 2 Drawing Sheets

BRAKE ASSEMBLY FOR A BICYCLE

BACKGROUND OF THE INVENTION

The field of the invention pertains to bicycle brakes and, in particular, to brakes which act upon the rims of bicycle wheels.

Such brakes have traditionally been caliper brakes which squeeze the rim between a pair of brake pads. Other traditional bicycle brakes are coaster brakes which are located on the bicycle wheel hub and engage the hub and axle.

Caliper brakes may be side pull, center pull or direct pull, depending on the location of the control cable in the connection to the caliper mechanical parts. Traditionally made of metal except for the brake pads, engineered plastics are now becoming part of the caliper mechanisms. Unfortunately, caliper brakes are prone to misalignment with frequent hard use. When misaligned, the brake pads do not smoothly and evenly engage the wheel rims.

SUMMARY OF THE INVENTION

With a view toward overcoming the disadvantages of caliper brakes, applicant has developed brakes wherein the brake pads move linearly into and out of engagement with the wheel rim. The new bicycle brakes aim at providing brakes with a simple structure for easy assembly. The brakes require few parts and are relatively easy to manufacture with little need for adjustment after assembly.

Each brake pad is mounted on a rod which moves linearly through a sleeve bearing. Complementary wedge members relatively movable along an inclined engagement surface cause the rod and brake pad to move back and forth out of and into engagement with the wheel rim. A retraction spring urges the rod and brake pad out of engagement with the wheel rim. A manually actuateable cable is connected to one of the wedge members to actuate the brake.

The complementary wedge members automatically compensate for brake pad wear in normal use. When brake pad wear exceeds compensation limits, thicker wedge members may be substituted in a simple manner without tools or disassembly of other components of the brake assembly.

Although all the new brake components, with the exception of the brake pads, may be conveniently made from common metals, most of the new brake components are particularly suitable for engineered plastics, such as mechanical grade TEFLON®.

DESCRIPTION OF THE PREFERRED EMBODIMENTS

Figure 1:
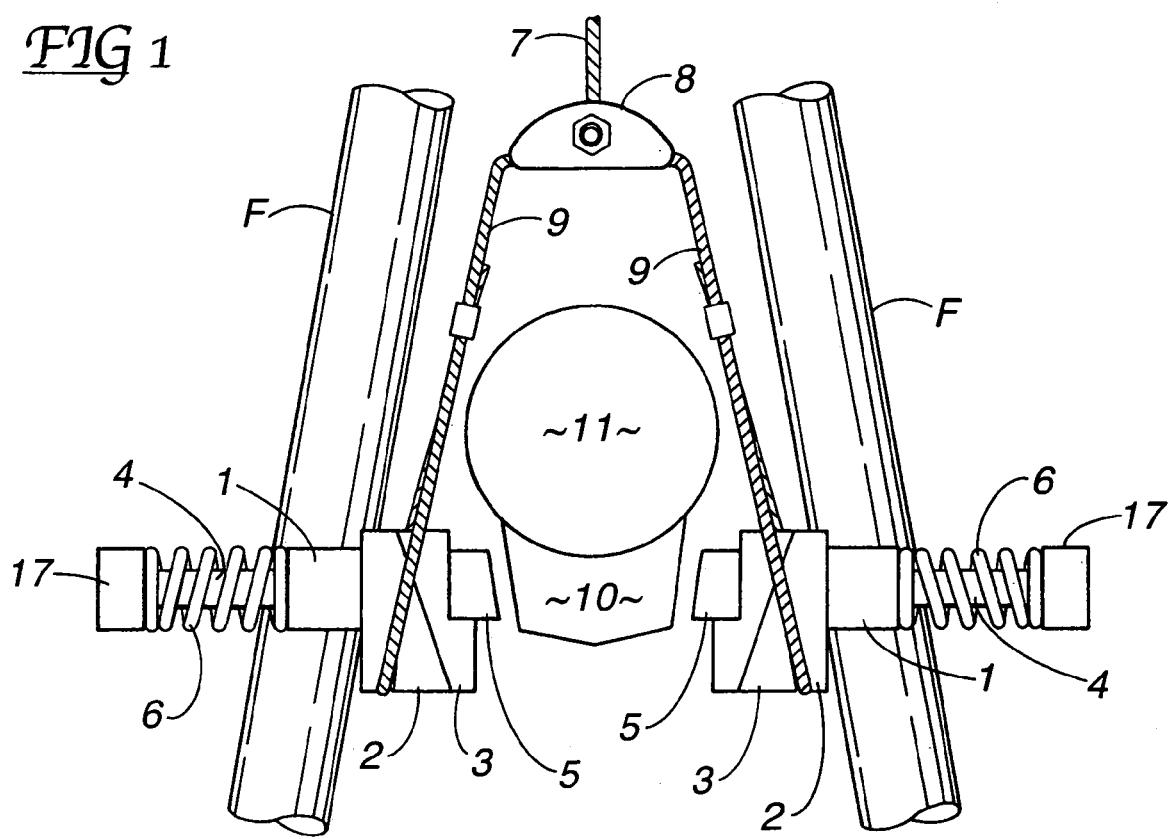
FIG. 1 is a front view of the new brake assembly in non-braking position with a portion of the bicycle frame or fork in background.
Figure 2:
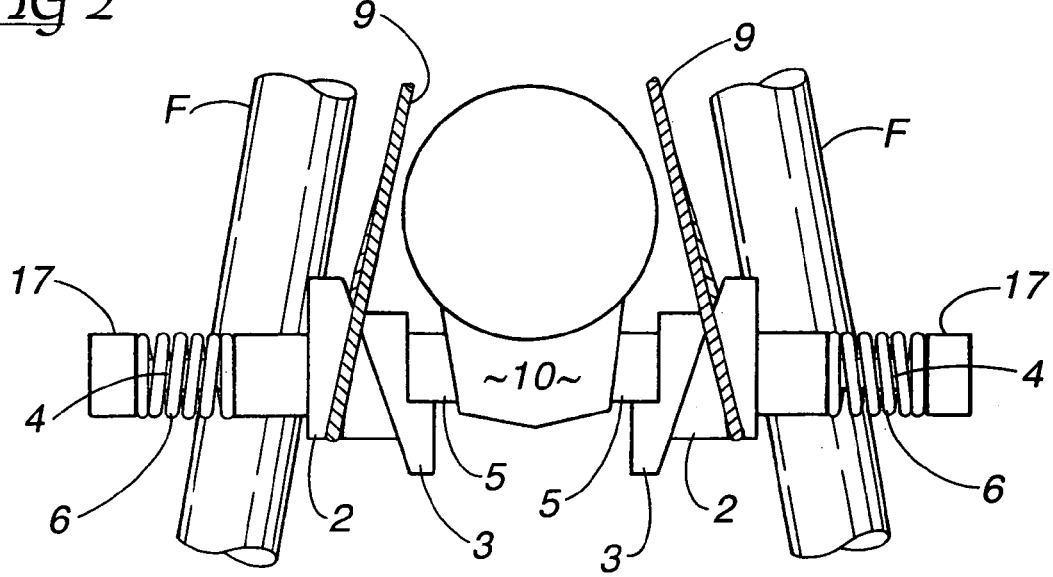
FIG. 2 is a front view of the new brake assembly in braking position with a portion of the bicycle frame or fork in background.

Referring to the drawings, in FIGS. 1 and 2 a pair of fixed bases 1 are rigidly attached to a pair of bicycle frame or fork members therebehind generally denoted by "F." The rigid attachment of each base 1 may be by welding or any suitable mechanical attachment that can withstand the considerable forces applied during hard braking. The bases 1 are aligned with the wheel rim 10 of the wheel 11.

Immediately adjacent and in vertical sliding engagement with each base 1 are a pair of spreading wedges 2 actuateable by vertically movable cables 9. In biased sliding contact with the spreading wedges 2 are a pair of complementary wedges 3. The complementary wedges 3 support and retain the brake pads 5 in position near the bicycle wheel rim 10 and tire 11, as shown in FIG. 1, or in contact with the rim 10 in FIG. 2. When the user operates the brake, cable 7 moves upwardly raising the bridge 8 and, in turn, cables 9 and the spreading wedges 2. The upward movement of wedge 2 causes rod 4 to move axially, compressing spring 6 and driving brake pad 5 against the rim 11.

Figure 3:
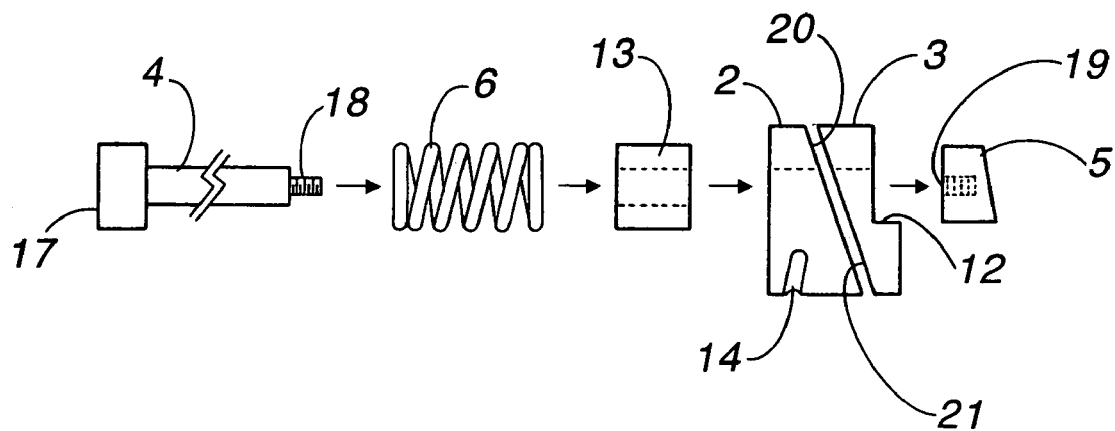
FIG. 3 is an exploded view of one of the brake pad actuators.

Rods 4 having heads 17 pass through each base 1 to each side of the wheel rim 10. As best shown in FIG. 3, each rod 4 includes a threaded tip 18 engageable with a threaded hole 19 in the back of the brake pad 5. Each rod 4 passes through spring 6, sleeve bearing 13, spreading wedge 2 and complementary wedge 3. Each sleeve bearing 13 is press fitted within a base 1, thus supporting and aligning the brake assembly on the bicycle.

Complementary wedge 3 includes a step 12 which supports the brake pad 5 in proper tangential alignment with respect to the wheel rim 10. The surfaces 20 and 21 of the spreading wedges 2 and complementary wedges 3 retain the tangential alignment through the spreading wedges to the cables 9 which, in turn, loop around and engage the spreading wedges in cable grooves 14. The spring 6, by urging the head 17 of the rod 4 away from the base 1, keeps all of the movable brake assembly parts engaged together and aligned with the sleeve bearing 13 through which rod 4 passes.

The mechanical stress upon the spreading wedge 2 during brake actuation is placed upon the cross-section of the wedge at the groove 14 by the cable 9 rather than going through the wedge, which could create a weak point and potential mechanical failure.

Figure 4A:
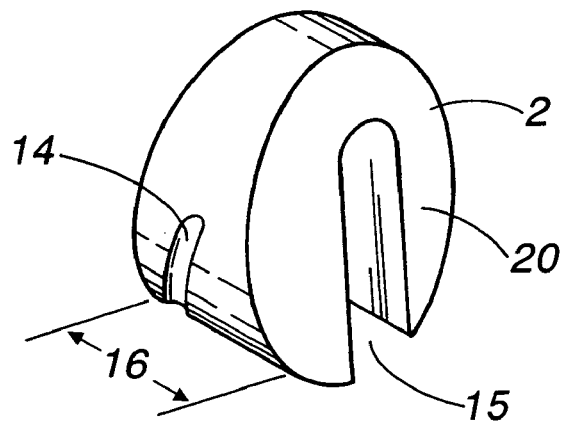
FIG. 4A is a detail of the radially movable wedge.
Figure 4B:
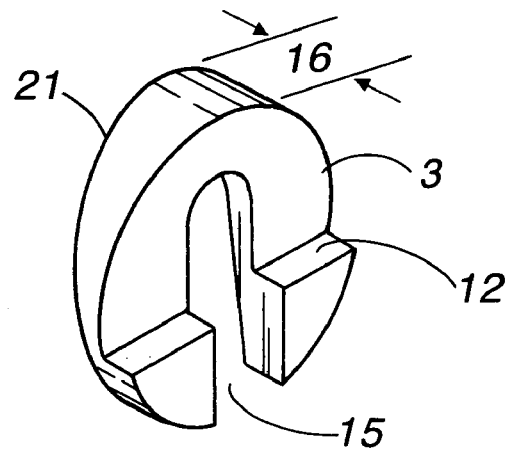
FIG. 4B is a detail of the axially movable wedge.

In FIGS. 4A and 4B, a spreading wedge 2 and a complementary wedge 3 are shown separate from the mechanism. Each wedge 2 and 3 includes a slot 15 to provide for a quick and tool-free removal of the wedges and brake pads 5 when the wheel 11 and rim 10 are removed. The tool-free removal also provides for interchangeability with other wedges of increased thickness 16 to accommodate brake pad 5 wear.

Both wedges 2 and 3 can be easily constructed from metal or plastic rod stock by forming groove 14, boring and slotting to form slot 15, forming step 12 at the rod end, cutting the rod on the bias to form surfaces 20 and 21 and wedge 3 and finally cutting the rod perpendicularly to complete wedge 2.

The angle of the confronting surfaces 20 and 21 of the spreading wedge 2 and the complementary wedge 3 has a profound effect on performance. Moderate angles will cause the wedges 2 and 3 to return to rest position quickly and with less spring 6 load than steeper angles and with less brake lever travel and consequent cable pull. However, braking performance will suffer, causing the user to squeeze very hard on the levers to apply the brakes.

Steep angles will provide increased stopping power but require greater spring 6 load to retract the wedges 2 and 3 and require significant lever travel and cable pull to actuate the brakes. Hence, greater stopping power is offset by increased spring load and lever travel. The confronting surface angle for optimum performance not only takes into account spring 6 load and lever travel but also the variables of brake pad composite, wheel rim material and coating.

The new brake design facilitates the use of polymer materials in the construction of the wedges 2 and 3 and is an option for rod 4 and other components, such as the bridge 8. In particular, mechanical grade Teflon or other plastics having low friction coefficient properties provide low surface friction when the spreading wedge 2 ascends and descends to move brake pad 5. With these modern plastics, machined or molded polymer parts can be cheaply mass produced. The polymer parts also weigh less than metal parts, an advantage in a weight obsessed performance market.

Tests of prototype brakes show that less mechanical effort is required than side and center pull conventional brakes. The new brakes provide smooth, even uniform braking pressure with less human effort because of the linear movement of the mechanism in contrast with the lateral movement in existing caliper brakes. Less effort is enhanced by the low surface friction of mechanical grade polymers. A safe anti-locking well-balanced braking force offers safety in contrast with direct-pull cantilevers that have been found in many cases to be excessive in stopping power and require special hand levers.

The new brakes have a particular compactness and can be assembled and disassembled easily. Simply depressing the head 17 and rod 4 with a thumb while canting and pressing the complementary wedge 3 upward will allow the wedge 3 to be removed, resulting in the proper clearance for wheel removal from the bicycle frame. Assembly is easy by again depressing the head 17 and rod 4 and then inserting the wedge 3 downward against the spreading wedge 2. Releasing the external pressure locks the assembly together. Thus, the assembly is held in place by the expansion of the spring 6 when the wedge 3 is either installed or removed.

Where simple disassembly is not as desired, the brake pad 5 could be bonded or otherwise made integral with the complementary wedge 3 and the rod 4 affixed to the wedge 3. This would eliminate any special metal or plastic brake pad holder normally associated with securing a brake pad 5.

What is claimed is:

1. A bicycle brake for applying a squeezing force to retard movement of a bicycle wheel comprising:
a pair of opposed rods constrained to move radially, means on each rod for frictionally engaging a bicycle wheel, said frictionally engaging means movable between an open non-braking position and a closed braking position and capable of applying force to the bicycle wheel in the closed braking position,
two pair of wedge members, at least one wedge of each pair adapted to move the frictionally engaging means and each pair having contacting planar surfaces there between, said planar surfaces inclined at a non-perpendicular and non-parallel angle relative to the direction of movement of the frictionally engaging means,
actuating means operably connected to at least one wedge of each pair of wedges whereby upon actuation of the at least one wedge in each pair relative movement occurs between the planar surfaces in turn causing linear closing movement of the frictionally engaging means and applying squeezing force on the bicycle wheel.

2. The bicycle brake of claim 1, including means urging the frictionally engaging means toward the open non-braking position.

3. The bicycle brake of claim 1 wherein the at least one wedge of each pair is manually removable from the actuation means.

4. The bicycle brake of claim 1 wherein the frictionally engaging means are mounted on at least one wedge of each pair of wedges.

5. The bicycle brake of claim 1 wherein the actuating means include means to connect a control cable to at least one wedge of each pair of wedges.

6. A bicycle brake comprising a pair of bases rigidly affixable to a bicycle, guide means on the bases and a pair of rods in engagement with the guide means for linear movement of the rods relative to the bases,
a pair of first wedges mounted on each rod and frictionally engaging means on each first wedge,
a pair of second wedges each in sliding engagement with a first wedge and a base whereby movement of the second wedges causes movement of the first wedges and rods relative to the bases, and
means to actuate the pair of second wedges.

7. The bicycle brake of claim 6 wherein the guide means include a through hole in each base, one of said rods passing through one base and the other rod passing through the other base.

8. The bicycle brake of claim 7, including means in engagement with each rod urging the rods and frictionally engaging means apart.

9. The bicycle brake of claim 8 wherein the urging means in engagement with each rod also engage each base.

10. The bicycle brake of claim 6 wherein each second wedge includes a slot formed therethrough for passage of one rod therethrough.

11. The bicycle brake of claim 10 wherein each first wedge includes a slot formed therethrough for passage of one rod therethrough.

12. The bicycle brake of claim 6 wherein the linear movement of the rods is on the same axis in opposite directions.

13. A bicycle brake for applying a squeezing force to retard movement of a bicycle wheel comprising:
a pair of opposed rods, means on each rod for frictionally engaging a bicycle wheel, said frictionally engaging means movable between an open non-braking position and a closed braking position,
two pair of wedge members, each pair of the wedge members having one of the rods passing therethrough, at least one wedge of each pair adapted to move the frictionally engaging means and each pair of wedges having contacting surfaces therebetween, the other wedge of each pair movable to cause the at least one wedge to move the frictionally engaging means, and
means to move the other wedge of each pair of wedges.

14. The bicycle brake of claim 13 wherein said contacting surfaces are planar and non-perpendicular to the rod axis.

15. The bicycle brake of claim 14 wherein the other wedge of each pair includes a second planar contacting surface spaced from the contacting surfaces between the wedges.

16. The bicycle brake of claim 15 wherein the second planar contacting surface is perpendicular to the rod axis.

* * * * *